(No Model.)
L. O. VINCENT.
METHOD OF PRODUCING LINE DRAWINGS.
No. 437,063. Patented Sept. 23, 1890.
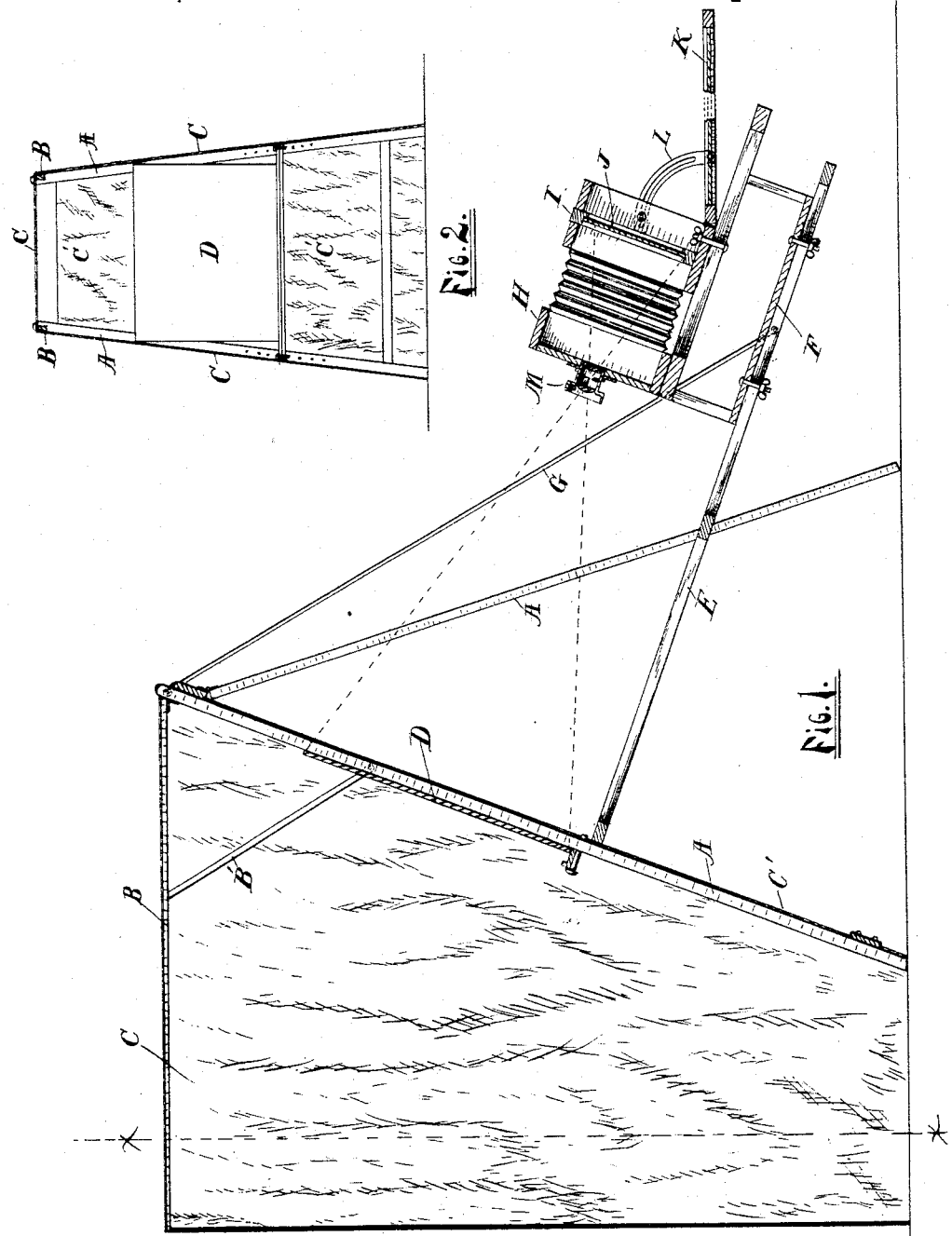
WITNESSES:
INVENTOR
Linneas O. Vincent
BY
Moulton & Rogers,
ATTORNEYS United States Patent Office.

LINNEAS O. VINCENT, OF PENTWATER, MICHIGAN, ASSIGNOR OF ONE-HALF TO FREDERIK NIELSEN, OF SAME PLACE.

METHOD OF PRODUCING LINE-DRAWINGS.

SPECIFICATION forming part of Letters Patent No. 437,063, dated September 23, 1890.

Application filed July 3, 1890. Serial No. 357,667. (No model.)

*To all whom it may concern:*

Be it known that I, LINNEAS O. VINCENT, a citizen of the United States, residing at Pentwater, in the county of Oceana and State of Michigan, have invented certain new and useful Improvements in the Method of Producing Line-Drawings; and I do hereby declare the following to be a full, clear, and exact description of the invention, such as will enable others skilled in the art to which it appertains to make and use the same.

My invention relates to an improvement in the method of producing line-drawings for etchings and other purposes; and it consists, essentially, in the process hereinafter described, and pointed out in the claim.

Heretofore such drawings have been produced by throwing an image of the object to be produced upon a semi-transparent plate, the reflecting apparatus being placed back of the operator. The light being at his back he labors under the disadvantage of being in his own light, so to speak. My method differs from this in respect to the arrangement of the apparatus. I place the ground glass or plate between the operator and the reflecting apparatus. The operator thus has the light in front of instead of behind him and is not in his own light, and can therefore work to much better advantage.

In order that my method may be more fully understood and that persons skilled in the art to which it appertains may be enabled to perform the same, and for a better illustration thereof, reference is to be had to the accompanying drawings, wherein—

Figure 1 is a vertical section of an apparatus adapted to secure the various parts in proper relation to practice my method, and Fig. 2 a vertical section on the line *x x* of Fig. 1.

A represents an easel, mounted to stand firmly and has a forwardly-projecting frame B, to which is attached a canopy C, of suitable material, to shut off the light from the rear of the plate, and the front of the easel is provided with a suitable screen or cover C′, through which is an opening in which is placed a plate D, of ground glass or other suitable semi-transparent material, upon which the drawing is made.

E represents a frame or track secured to the rear of the easel, at right angles to the frame D, upon which is mounted a frame F, adjustable longitudinally thereon to support a camera in proper position.

H represents a camera-box secured on said frame and carrying a frame I, which supports a negative J, upon which is the image to be drawn.

K is a mirror attached to the camera and vertically adjustable by means of the sector L.

M is the camera objective.

It will now be seen and readily understood that by means of the reflector K any image upon the negative J will be thrown enlarged upon D, and that the operator placing himself in front of the easel and having the light shut off to his rear and at both sides, as specified is enabled to draw upon the surface of D an exact copy of such image, and that the drawing so produced is then available for a variety of purposes in the arts.

I am aware that it is not new to throw images upon semi-transparent plates by means of a reflector through a lens, but I am not aware that this method has been employed or practiced in the manner described or for the purpose specified; therefore

I claim as new and desire to secure by Letters Patent of the United States—

The herein-described method of producing line-drawings for use in the arts, consisting in first making a negative of the object to be drawn; second, placing the negative in a photographic camera open front and rear; third, placing in front of the camera a plate of semi-transparent substance suitable to make a drawing upon and excluding the light from the rear thereof; fourth, by means of a suitable reflector throwing a reflection of the image upon the negative upon the said plate of semi-transparent substance, and, fifth, making upon the surface of the plate upon the side opposite to the camera a line-drawing corresponding to said image, substantially as described, and for the purposes herein set forth.

In testimony whereof I affix my signature in presence of two witnesses.

LINNEAS O. VINCENT.

Witnesses:
S. E. RUSSELL,
J. C. JENSEN.